United States Patent
Kristensen

(10) Patent No.: US 9,697,430 B2
(45) Date of Patent: Jul. 4, 2017

(54) METHOD AND APPARATUS FOR IDENTIFYING ROAD SIGNS

(71) Applicant: Conti Temic microelectric GmbH, Nuremberg (DE)

(72) Inventor: Steen Kristensen, Lindenberg im Allgaeu (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 8 days.

(21) Appl. No.: 14/902,246

(22) PCT Filed: Sep. 4, 2014

(86) PCT No.: PCT/DE2014/200444
§ 371 (c)(1),
(2) Date: Dec. 30, 2015

(87) PCT Pub. No.: WO2015/048954
PCT Pub. Date: Apr. 9, 2015

(65) Prior Publication Data
US 2017/0017849 A1    Jan. 19, 2017

(30) Foreign Application Priority Data
Oct. 1, 2013    (DE) .......... 10 2013 219 909

(51) Int. Cl.
*G06K 9/00*    (2006.01)
*G06K 9/32*    (2006.01)
(Continued)

(52) U.S. Cl.
CPC ....... *G06K 9/00818* (2013.01); *G06K 9/3241* (2013.01); *G06K 9/3258* (2013.01); *G06K 9/40* (2013.01); *G06K 2209/01* (2013.01)

(58) Field of Classification Search
CPC .................. G06K 9/00; G08G 1/00
(Continued)

(56) References Cited

U.S. PATENT DOCUMENTS

| | | |
|---|---|---|
| 4,566,124 A | 1/1986 | Yamamoto et al. |
| 4,901,362 A | 2/1990 | Terzian |

(Continued)

FOREIGN PATENT DOCUMENTS

| | | |
|---|---|---|
| DE | 198 52 631 | 5/2000 |
| DE | 199 38 256 | 2/2001 |

(Continued)

OTHER PUBLICATIONS

International Search Report of the International Searching Authority for International Application PCT/DE2014/200444, mailed Dec. 4, 2014, 3 pages, European Patent Office, HV Rijswijk, Netherlands.

(Continued)

*Primary Examiner* — Abolfazl Tabatabai
(74) *Attorney, Agent, or Firm* — W. F. Fasse

(57) ABSTRACT

The invention relates to a method and a device for recognizing a road sign (Hz, Zz) by means of a camera from a traveling vehicle. The method has the following steps:
 acquiring at least one image of the surroundings of a vehicle by means of the camera,
 determining the presence of at least one road sign (Hz, Zz) in the at least one acquired image of the surroundings of the vehicle,
 determining (also estimating) motion blur in that image segment in which the present road sign (Hz, Zz) is situated,
 subtracting out motion blur in this image segment, which results in a sharpened image segment, and
 recognizing the road sign (Hz, Zz) while taking account of the sharpened image segment.

10 Claims, 2 Drawing Sheets a b

(51) Int. Cl.
*G06K 9/40* (2006.01)
*G08G 1/095* (2006.01)
*G08G 1/07* (2006.01)
*G06F 19/00* (2011.01)

(58) Field of Classification Search
USPC ........ 382/103, 104; 340/907, 910, 917, 988; 701/117, 118, 469, 514
See application file for complete search history.

(56) References Cited

U.S. PATENT DOCUMENTS

| | | | |
|---|---|---|---|
| 5,594,806 A | 1/1997 | Colbert | |
| 6,208,758 B1 | 3/2001 | Ono et al. | |
| 6,560,529 B1* | 5/2003 | Janssen | G01C 21/28 340/988 |
| 6,690,842 B1 | 2/2004 | Silver et al. | |
| 6,801,638 B1 | 10/2004 | Janssen et al. | |
| 6,842,177 B2 | 1/2005 | Garg et al. | |
| 6,888,892 B2 | 5/2005 | Chung et al. | |
| 7,034,848 B2 | 4/2006 | Sobol | |
| 7,058,206 B1 | 6/2006 | Janssen et al. | |
| 7,209,141 B2 | 4/2007 | Garg et al. | |
| 7,346,222 B2 | 3/2008 | Lee et al. | |
| 7,466,841 B2* | 12/2008 | Bahlmann | G06K 9/00818 382/103 |
| 8,064,643 B2* | 11/2011 | Stein | G06K 9/00818 382/103 |
| 8,144,033 B2 | 3/2012 | Chinomi et al. | |
| 8,170,340 B2 | 5/2012 | Klefenz | |
| 8,174,570 B2 | 5/2012 | Yoneyama et al. | |
| 8,233,670 B2 | 7/2012 | Moed et al. | |
| 8,340,420 B2 | 12/2012 | Smith et al. | |
| 8,346,706 B2 | 1/2013 | Groitzsch et al. | |
| 8,370,755 B2 | 2/2013 | Buecker et al. | |
| 8,379,014 B2 | 2/2013 | Wiedemann et al. | |
| 8,391,612 B2 | 3/2013 | Natroshvili et al. | |
| 8,396,295 B2 | 3/2013 | Gao et al. | |
| 8,452,524 B2 | 5/2013 | Groitzsch et al. | |
| 8,639,433 B2 | 1/2014 | Meis et al. | |
| 8,731,244 B2 | 5/2014 | Wu | |
| 8,872,918 B2 | 10/2014 | Kroekel | |
| 8,953,842 B2 | 2/2015 | Zobel | |
| 8,995,723 B2 | 3/2015 | Stein et al. | |
| 9,160,993 B1 | 10/2015 | Lish et al. | |
| 9,177,212 B2 | 11/2015 | Meis et al. | |
| 2003/0059088 A1 | 3/2003 | Culp et al. | |
| 2003/0202683 A1 | 10/2003 | Ma et al. | |
| 2005/0086051 A1 | 4/2005 | Brulle-Drews | |
| 2005/0111698 A1 | 5/2005 | Kawai | |
| 2005/0232469 A1 | 10/2005 | Schofield et al. | |
| 2006/0034484 A1 | 2/2006 | Bahlmann et al. | |
| 2006/0098877 A1 | 5/2006 | Barnes et al. | |
| 2007/0050134 A1 | 3/2007 | Hayashida et al. | |
| 2007/0081739 A1 | 4/2007 | Wilbrink et al. | |
| 2008/0107345 A1 | 5/2008 | Melikian | |
| 2008/0137908 A1 | 6/2008 | Stein et al. | |
| 2008/0199050 A1 | 8/2008 | Koitabashi | |
| 2009/0074249 A1 | 3/2009 | Moed et al. | |
| 2009/0143974 A1 | 6/2009 | Adachi et al. | |
| 2009/0312888 A1 | 12/2009 | Sickert et al. | |
| 2010/0198488 A1 | 8/2010 | Groitzsch et al. | |
| 2010/0328316 A1 | 12/2010 | Stroila et al. | |
| 2011/0157659 A1 | 6/2011 | Zenju | |
| 2012/0083960 A1 | 4/2012 | Zhu et al. | |
| 2012/0128210 A1 | 5/2012 | Zobel | |
| 2012/0245832 A1 | 9/2012 | Meis et al. | |
| 2013/0011016 A1 | 1/2013 | Haas et al. | |
| 2013/0058534 A1 | 3/2013 | Zobel | |
| 2014/0119605 A1 | 5/2014 | Zobel | |

FOREIGN PATENT DOCUMENTS

| | | |
|---|---|---|
| DE | 199 48 734 | 4/2001 |
| DE | 103 11 240 | 9/2004 |
| DE | 103 43 941 | 5/2005 |
| DE | 102005017541 | 10/2006 |
| DE | 102005052175 | 5/2007 |
| DE | 102005062154 | 7/2007 |
| DE | 102006023544 | 11/2007 |
| DE | 102006053289 | 5/2008 |
| DE | 102007002562 | 7/2008 |
| DE | 102007010013 | 9/2008 |
| DE | 102008057675 | 7/2009 |
| DE | 102009036196 | 5/2010 |
| DE | 102009039450 | 5/2010 |
| DE | 102012212091 | 1/2013 |
| DE | 102011109387 | 2/2013 |
| EP | 0 149 457 | 7/1985 |
| EP | 1 503 354 | 2/2005 |
| EP | 1 508 889 | 2/2005 |
| EP | 2 026 313 | 2/2009 |
| EP | 2 048 597 | 4/2009 |
| EP | 2 103 984 | 9/2009 |
| EP | 2 116 984 | 11/2009 |
| JP | 2006-031618 A | 2/2006 |
| JP | 2007-263629 A | 10/2007 |
| JP | 2008-176357 A | 7/2008 |
| WO | WO 91/17518 | 11/1991 |
| WO | WO 2005/090918 | 9/2005 |
| WO | WO 2008/135604 | 11/2008 |
| WO | WO 2009/135460 | 11/2009 |
| WO | WO 2013/017125 | 2/2013 |

OTHER PUBLICATIONS

PCT International Preliminary Report on Patentability including English Translation of PCT Written Opinion of the International Searching Authority for International Application PCT/DE2014/200444, issued Apr. 5, 2016, 11 pages, International Bureau of WIPO, Geneva, Switzerland.

German Search Report for German Patent Application No. 10 2013 219 909.0, dated Jul. 14, 2014, 7 pages, Muenchen, Germany, with English translation, 5 pages.

Taeg Sang Cho et al., "Blur Kernel Estimation Using the Radon Transform", IEEE Conference on Computer Vision and Pattern Recognition (CVPR) 2011, pp. 241 to 248.

Michel Irani et al., "Improving Resolution by Image Registration", in CVGIP: Graphical Models and Image Processing, vol. 53, No. 3, May 1991, pp. 231 to 239.

Céline Mancas-Thillou et al., "Chapter 14: An Introduction to Super-Resolution Text", In: Chaudhuri, Bidyut B.: "Digital Document Processing, Major Directions and Recent Advances", 2007, Springer Verlag Publisher, London, GB, XP002732930, especially pp. 305 to 327.

Jung Hak An et al., "Traffic Sign Detection by Dominant Color Transform and Symbol Recognition by Circular Shift of Distributions on Concentric Circles", Proceedings of ITC-CSCC, Jan. 1, 1997, Okinawa, Japan, XP055154657, pp. 287 to 290 and section 2.1; retrieved from http://www.dbpia.co.kr/Journal/ArticleDetail/284358 on Nov. 24, 2014.

Johannes Brauers et al., "Direct PSF Estimation Using a Random Noise Target", Institute of Imaging and Computer Vision, Proceedings of SPIE-IS&T vol. 7537, Jan. 17, 2010, Aachen, Germany, XP055154644, pp. B-1 to B-10 and abstract.

Xing Yu Qi et al., "Motion Deblurring for Optical Character Recognition", Eighth International Conference on Document Analysis and Recognition (ICDAR '05), IEEE, Aug. 31, 2005, Singapore, XP010877977, pp. 389 to 393 and abstract.

Wang, Yongping et al., National University of Defense Technology, ChangSha, China, "A Method of Fast and Robust for Traffic Sign Recognition", Fifth International Conference on Image and Graphics, Sep. 20, 2009, IEEE, NJ, USA, XP031652742, pp. 891 to 895.

Priese, Lutz et al., University of Koblenz-Landau, Koblenz, Germany, "Ideogram Identification in a Realtime Traffic Sign Recognition System", Intelligent Vehicles '95 Symposium, Sep. 25, 1995, Michigan, USA; IEEE, NY, USA, XP010194135, pp. 310 to 314.

Hoessler, Helene et al., "Classifier Training Based on Synthetically Generated Samples", 5th International Conference on Computer

(56) References Cited

OTHER PUBLICATIONS

Vision Systems, Mar. 21, 2007, Applied Computer Science Group, Bielefeld University, Germany, XP002510914, pp. 1 to 10.

X. W. Gao et al., "Recognition of traffic signs based on their colour and shape features extracted using human vision models", Journal of Visual Communication and Image Representation, vol. 17, Issue 4, Aug. 2006, pp. 675 to 685.

Hiroyuki Ishida et al., "Identification of Degraded Traffic Sign Symbols by a Generative Learning Method", Proceedings of the 18$^{th}$ International Conference on Pattern Recognition, 2006, pp. 1 to 4.

\* cited by examiner a b

METHOD AND APPARATUS FOR IDENTIFYING ROAD SIGNS

The invention relates to a method and a device for road sign contents recognition according to the preamble of the independent claims.

Modern driver assistance systems are being increasingly equipped with an electronic road sign recognition system in order to, e.g., warn the driver in the event of speeding. For this purpose, a camera typically acquires images of that region of the surroundings which is in front of the vehicle and delivers corresponding image data to an image analysis device that analyzes and classifies the image data by means of an algorithm in order to identify a road sign therefrom. Such a method is known from, e.g., DE 198 52 631 A1.

Subsequently, the information from road signs that have been recognized in such a manner may be integrated into a driver assistance function, e.g., as an indication of the current speed limit in the instrument cluster of the vehicle.

WO 2009/135460 A1 shows a method for exposure control for a camera in a motor vehicle, said exposure control enabling two driver assistance functions with different exposure requirements (e.g., lane detection and road sign recognition at night) to be realized by means of one common camera, whereby it is possible to use (in particular, when driving speeds are high) a sufficiently short exposure time for road sign recognition image data in order to avoid/minimize motion blur so that the contents of the road sign can be recognized.

In many cases, the road signs positioned in road traffic are provided with one or more additional signs that specify or situationally restrict the meaning of the main sign.

WO 2013/017125 A1 shows a method for road sign recognition in which additional signs are classified as far as possible by means of a pattern recognition method, text of additional signs is read and interpreted by means of a text recognition method if classification was not possible at all or not completely possible, and an assessment of relevance is performed in which the recognized text is compared with situation data.

A fundamental difficulty with reading the contents of texts and, in particular, with reading variable text elements on road signs consists in the fact that said reading requires images that exhibit sufficient resolution and sharpness.

The object of the invention is to respond to said difficulty and to specify a method for a fast and reliable recognition of the contents of road signs with a variable text component.

This object is achieved by the features of the independent claims. Advantageous further developments of the invention are the subject matter of the subclaims, wherein combinations and further developments of individual advantageous features are also possible.

One starting point of the invention consists in the following considerations:

Nowadays, cameras are principally capable of providing good resolution and sharpness. However, this is not always sufficient for the complete recognition of road signs when cameras are employed in a moved vehicle, with different exposure times, particularly when it is dark, given the quality of the employed optical system/objective lens and the employed resolution of the image acquisition sensor.

In the foreseeable future, it will be impossible, for reasons of economy, to increase the image quality of vehicle cameras (the optical system and the resolution and sensitivity of the imaging system) such that reading road signs with a variable text component will be possible directly. Therefore, the approach of the present invention consists in determining the motion blur of a road sign from an image/from a sequence of images.

An inventive method for recognizing a road sign by means of a camera from a traveling vehicle has the following steps:

acquiring at least one image of the surroundings of a vehicle by means of the camera, determining the presence of at least one road sign in the at least one acquired image of the surroundings of the vehicle, determining motion blur in that image segment in which the present road sign is situated, subtracting out motion blur in this image segment, which results in a sharpened image segment, and recognizing the road sign while taking account of the sharpened image segment.

In particular, the camera is a forward-oriented mono camera, preferably with a color-resolution image acquisition sensor (CMOS or CCD), which mono camera may be arranged, e.g., behind the windshield (e.g., in the region of the inside mirror). Alternatively, an advantage of a stereo camera consists in the fact that it provides spatial information about the surroundings of the vehicle.

Preferably, in addition to road sign recognition, further camera-based driver assistance functions, such as lane departure warning, lane keeping assist, intelligent headlamp control, forward collision warning, precipitation detection, adaptive cruise control, park assist, emergency brake assist and/or emergency steering assist, may be realized on the basis of an image or of a sequence of images of the vehicle camera.

The determination of motion blur comprises the estimation of motion blur, but also the calculation of motion blur, particularly of a blur kernel or of a point spread function.

Subsequently, the influence of motion blur on the acquired image can be subtracted out by a deconvolution of the blurred image or of a blurred image segment, which results in a sharpened image (image segment).

The recognition of the road sign while taking account of the sharpened image segment may be performed by pattern recognition, classification, or text recognition (OCR).

An advantage of an inventive method consists in the fact that the influence of motion blur on images of the surroundings acquired by a camera of a traveling vehicle that include road signs can be reduced or even eliminated, whereby a reliable and complete recognition of road signs is possible.

In one preferred embodiment, the step of "recognizing the road sign while taking account of the sharpened image segment" comprises text recognition in the sharpened image segment, whereby a complete recognition of variable text components in road signs is possible.

Advantageously, data characterizing the proper motion of the vehicle are analyzed for the purpose of determining motion blur. The motion blur of road signs images of which are acquired while the vehicle is in motion only originates from the motion of the camera, i.e., typically only from the proper motion of the vehicle in the case of a camera fixed in the vehicle. This reason may be taken into account by being aware of the current proper motion of the vehicle, optionally in combination with imaging properties of the camera system and the geometric relationship between the camera and the road sign. Such data may be provided, e.g., by vehicle motion sensors. Information about the proper motion of the vehicle may also be provided by image data analysis, particularly in the case of a stereo camera.

According to one preferred embodiment, edges are determined and analyzed in that image segment in which the present road sign is situated in order to determine motion blur in said image segment. One possible way to estimate motion blur from edges in the blurred image is suggested by T. S. Cho, S. Paris, W. T. Freeman and B. Horn in "Blur kernel estimation using the Radon transform", 2011 IEEE Conference on Computer Vision and Pattern Recognition (CVPR).

Preferably, a static content of a road sign is used to partially recognize the road sign from the acquired image. A predetermined road sign template corresponding to the partially recognized road sign is taken into account when determining motion blur in the image segment. The variable content of the road sign is recognized while taking account of the sharpened image segment, whereby the road sign, particularly a main sign, is already available as a partially or even completely recognized sign at the time of motion blur estimation, whereby the appearance of the road sign without motion blur (road sign template) is known and can be taken into account when determining motion blur.

In an advantageous further development, the static content comprises the shape and the edge of a main road sign, wherein the variable content is that content which is enclosed by the edge of the main road sign in the image segment.

Preferably, the image segment is formed such that it includes at least one main road sign and all additional signs that are assigned to this main road sign. Of course, there may be only one individual additional sign if only one additional sign is assigned to the main road sign. In that case, the at least one main road sign can be completely recognized as the static content and the content of the additional sign/s can be recognized as the variable content, which is advantageous because, inter alia, the edge (clear edges) of additional signs cannot be detected properly in many cases and additional signs often have variable contents, wherein not all of those contents can be trained in advance.

In one alternative advantageous embodiment, a separate image segment is formed for each individual road sign (main sign or additional sign) in the image. Subsequently, a check as to whether at least two road signs are assigned to each other is performed, particularly on the basis of their geometric arrangement with respect to each other. In the event of a detection of an assignment of two road signs in a first image segment and a second image segment/further image segment/s, motion blur is determined only for the first image segment and then adopted for the second image segment/the further image segments. The first image segment may advantageously include a main road sign, particularly a main road sign that can be completely recognized without performing text recognition.

In many cases, the recognition of an additional sign from blurred image segments is very difficult. By not calculating motion blur with respect to the additional sign still unknown but with respect to the associated main sign (e.g., speed limit or no-passing sign), said calculation is made considerably easier and more precise because main signs are larger and can be detected very well because of their bold red edges. Since the main sign and the additional sign are positioned directly one above the other or next to one another and are detected in the same image, the parameters of motion blur of the two signs are nearly identical and can thus be transferred from the main sign to the additional sign.

Preferably, if the recognition of the road sign while taking account of the sharpened image segment of an individual image is not successful or not reliable, a synthetic highly sharp image segment is created from a plurality of sharpened image segments extracted from successive images acquired by the camera, each of said sharpened image segments including the same road sign. This means that all main procedure steps are repeated for successive images, except for the step of "recognizing the road sign while taking account of the sharpened image segment". A synthetic highly sharp image segment is now calculated from said plurality of sharpened image segments that show the same road sign. Such methods for creating higher-resolution synthetic images are known per se (see, e.g., "Improving resolution by image registration" by M. Irani, S. Peleg in CVGIP: Graphical Models and Image Processing, Vol. 53, No. 3, pp. 231-239, 1991). This means that a high-quality synthetic image can be calculated from a sequence of several real images acquired by a camera (e.g., of low-quality additional signs), which high-quality synthetic image can then be read by means of text recognition.

The road sign is then recognized while taking account of the synthetic highly sharp image segment, which further enhances the reliability and availability of road sign recognition.

The invention also relates to a device for road sign recognition comprising a camera for acquiring at least one image of the surroundings of a vehicle from a traveling vehicle and an image analysis unit, wherein the image analysis unit is designed such that it detects the presence of one or more road signs (Hz, Zz) from the acquired image data, determines motion blur in that image segment in which the present road sign (Hz, Zz) is situated, subtracts motion blur out in this image segment, which results in a sharpened image segment, recognizes the road sign (Hz, Zz) while taking account of the sharpened image segment, and can generate a corresponding output signal.

Further advantages of the invention can be inferred from the description and the drawings. Exemplary embodiments are shown in the drawing in a simplified manner and will be explained in greater detail in the following description.

Figure 1:
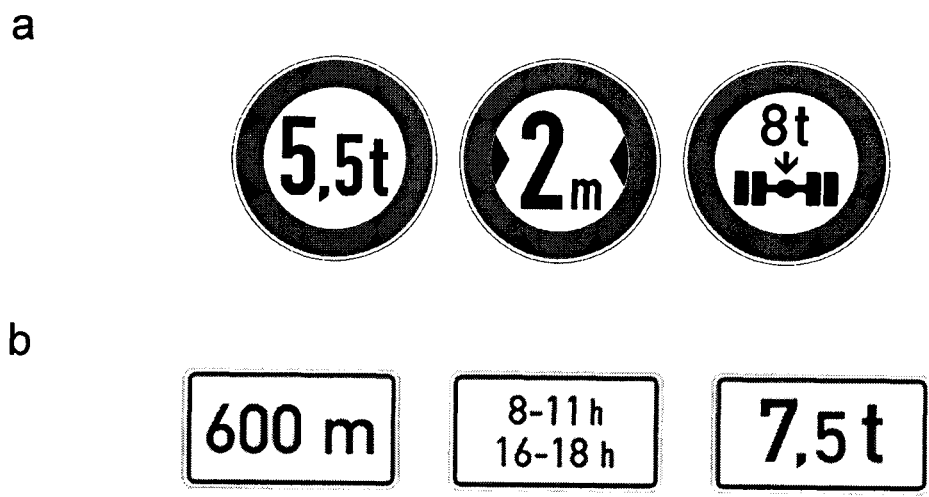
FIG. 1 shows examples of road signs with variable contents (a) main signs and b) additional signs).

FIG. 1 shows road signs with variable contents, particularly with variable text contents: FIG. 1*a* shows main signs with variable text contents, particularly a ban on vehicles having (from left to right) an actual mass of more than 5.5 tons, an actual width of more than 2 meters (including outside mirror) and an actual axle load of more than 8 tons, respectively.

FIG. 1*b* shows additional signs with variable text contents that restrict the validity of the assigned main sign (not shown in FIG. 1) to a distance of 600 meters from the main sign, to a time period from 8 to 11 o'clock am and from 4 to 6 o'clock pm and for vehicles having an actual mass from 7.5 tons, respectively. This means that, in particular, the numerical values are "variable text contents" in the road signs of FIG. 1. A complete recognition of such road signs, particularly by means of pattern recognition, is difficult. Text recognition (e.g., OCR) requires acquired images of these road signs that exhibit sufficient resolution and sharpness. However, images acquired by means of a vehicle camera from a traveling car are blurred, which originates from the motion of the vehicle (and thus of the camera) with respect to the road sign (motion blur). The shorter the exposure time of a camera image, the less motion blur is present. However, a minimum exposure time is required when it is dark in order to be able to identify at least something in the acquired image data.

Especially with the road signs (Hz, Zz) shown by way of example in FIG. 1, a complete recognition thereof by a camera-based driver assistance system is not always possible because of the motion blur of the acquired images. In order to counteract that, one inventive exemplary embodiment provides for a search for present road signs (Hz, Zz) in an image of the surroundings of the vehicle acquired by means of the camera. If road signs (Hz, Zz) are determined in an image segment, motion blur in this image segment is determined (calculated or at least estimated). This calculation/estimation is subject matter of current research, particularly with hand-held cell phone cameras/photo cameras that often produce blurred images when the shutter is released. Motion blur is typically determined as a blur kernel or as a point spread function. Only by means thereof, the blurred image can be subjected to a specific deconvolution, which results in a sharpened image.

According to one possible approach, the kernel is estimated from edges in the blurred image: "Blur kernel estimation using the Radon transform", T. S. Cho, S. Paris, W. T. Freeman, B. Horn, 2011 IEEE Conference on Computer Vision and Pattern Recognition (CVPR).

In this context, road sign recognition provides two features that make the above approach appear advantageous: Road signs (Hz, Zz) have clear edges and, except for variable contents (V), sharp images of the static contents of road signs (S) are known, such as the general prohibiting sign that can be regarded as a template for all special prohibiting signs. Both features facilitate an efficient application of, e.g., the solution for an estimation of motion blur and the deconvolution based thereon suggested by Cho et al.

Subsequently, the influence of the determined motion blur on this image segment is subtracted out, which results in a sharpened image segment. The complete recognition of the road sign (Hz, Zz), particularly by means of text recognition for reading the variable text content, is then performed while taking account of the image segment sharpened in such a manner.

Preferred exemplary embodiments of the invention will be explained in greater detail on the basis of FIG. 2 to FIG. 4.

Figure 2:
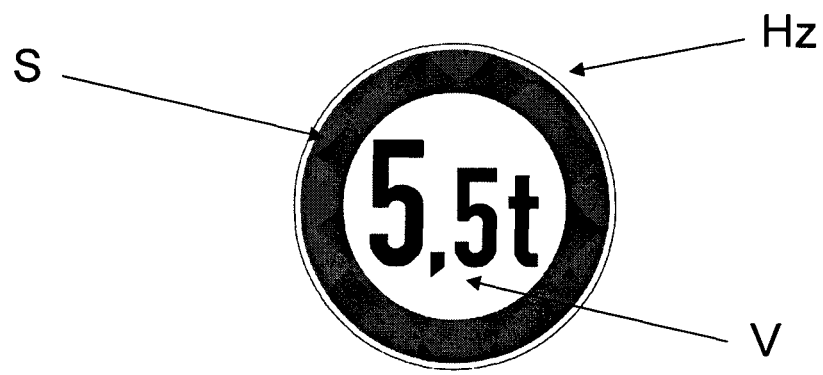
FIG. 2 shows a main sign with a variable text content.

FIG. 2 shows the first road sign of FIG. 1a: a ban on vehicles having an actual mass of more than 5.5 tons.

This road sign can be subdivided into a static component (S) (its shape and edge, i.e., essentially the red ring that is characteristic of prohibiting signs) and a variable component (V) (text "5.5t" in the present sign). In many cases, camera-based road sign recognition provides the possibility of recognizing from the acquired image data with motion blur that this road sign (Hz) is a prohibiting sign. However, the acquired image data with motion blur are too noisy for successful text recognition so that it is often impossible to directly infer from said data what or who the prohibition of this prohibiting sign refers to. Therefore, the motion blur of that image segment in which the road sign (Hz) is included is determined/estimated. This is possible because the circular shape and the red edge of the prohibiting sign can be detected very well and, above all, can be recognized at the time of motion blur estimation already, whereby the appearance thereof without motion blur is known. This estimated motion blur is then used to sharpen the image segment within the circular red edge (V) by subtracting out motion blur. Subsequently, a recognition/text recognition of this inner image segment (V) is possible, the result of said recognition being that said image segment includes the text "5.5t", whereby the regulatory content of this road sign (ban on vehicles having an actual mass of more than 5.5 tons) is completely comprehended, which can now be communicated to the driver of a vehicle (e.g., by showing a corresponding symbol in the instrument cluster) or compared with vehicle-specific data (e.g., the current or maximum actual mass of the vehicle) and rejected if irrelevant (e.g., to an automobile) or outputted from the road sign recognition system to a vehicle navigation device or an autonomous vehicle control device.

Figure 3:
FIG. 3 shows a main sign (speed limit) with an additional sign with a text in French.

FIG. 3 shows a main sign (Hz) (speed limit of 50 km/h) with an additional sign (Zz) with the French text "par temps de pluie", which means that the speed limit stipulated by the assigned main road sign is valid in the event of rain/wetness only. Strictly speaking, this text is not variable in France but it would be desirable to be able to read the individual letters of such texts without knowing possible text contents before for the purpose of a road sign recognition that is capable of recognizing and interpreting the contents of additional signs in as many different countries as possible or in several languages. Therefore, this is the variable text component (V) to be recognized according to the invention. When this variable text component is recognized, it is at least possible to show this text, as additional information about the speed limit, to the driver in the instrument cluster or to search for the meaning of or a translation of the recognized words in vehicle databases or in the cloud.

According to one embodiment of the method, the image segment is designed such that it comprises the main road sign (Hz) and the individual assigned additional sign (Zz). The motion blur for this entire image segment can then be determined on the basis of the motion blur for the main sign (Hz). For this purpose, the entire main sign can be assumed to be a static content (S) since there are not so many possible speed limit values. By analogy with the procedure performed in connection with FIG. 2, the variable content (V), i.e., the additional sign (Zz) in the present case, can now be recognized/read from the image segment sharpened while taking account of the determined motion blur.

Figure 4:
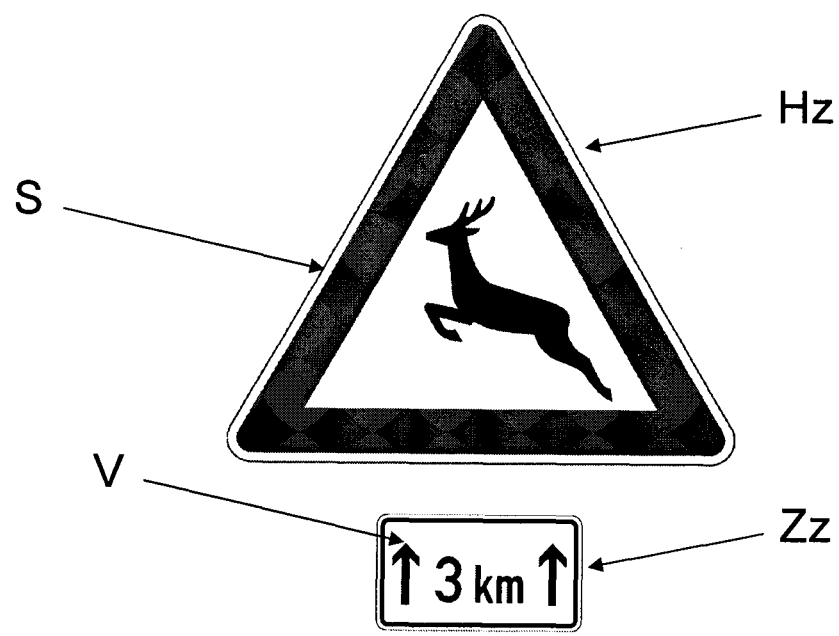
FIG. 4 shows a main sign with an assigned additional sign.

FIG. 4 shows a main road sign (Hz) (warning sign "Wild Animals") with an assigned additional sign (Zz) that limits the validity of the warning sign to "3 km".

According to one advantageous embodiment, the main sign (Hz) and the additional sign (Zz) are recognized as two separate road signs and two corresponding separate image segments are formed. Subsequently, a check as to whether the two road signs (Hz, Zz) are assigned to each other is performed. Their assignment to each other is recognized on the basis of the present arrangement (main sign positioned directly above the additional sign). Motion blur is now determined only for the first image segment, in which the main sign (Hz) is situated. The main sign (Hz) can be completely recognized without performing text recognition, possibly from the acquired (blurred) image already, but let us assume that recognition will be successful after the estimation of motion blur and subsequent deconvolution only. In any case, the calculation/estimation of motion blur for the image segment of the main sign (Hz) is considerably easier and more precise. The main sign is larger and can be detected very well because of its bold red edge (triangular in the present case). Since the main sign (Hz) and the additional sign (Zz) are positioned directly one above the other or next to one another and are detected in the same image, the parameters of motion blur of the two signs are nearly identical and can thus be transferred from the main sign (Hz)

to the additional sign (Zz). Consequently, the deconvolution of the image segment with the additional sign (Zz) can be performed directly and the content of the additional sign (Zz) can then be recognized/read in the sharpened image detail.

If the complete reading of the additional sign (Zz) is still not possible, one further development of the method would provide a solution consisting in creating a synthetic highly sharp image segment from a plurality of sharpened image segments extracted, as described, from successive images acquired by the camera, each of said sharpened image segments including the additional sign (Zz). This synthetic highly sharp image segment facilitates the complete recognition of the additional sign (Zz) and thus of the regulatory content of the combination of the main sign (Hz) and, the additional sign (Zz).

The invention claimed is:

1. A method of recognizing a road sign (Hz, Zz) by a camera from a traveling vehicle, comprising steps:
   acquiring at least one image of surroundings of the vehicle by the camera,
   determining that at least one road sign (Hz, Zz) is present in the at least one image of the surroundings of the vehicle,
   determining a motion blur in the at least one image in an image segment thereof in which the road sign (Hz, Zz) is situated,
   subtracting out at least some of the motion blur in the image segment, which results in a sharpened image segment, and
   recognizing the road sign (Hz, Zz) while taking account of the sharpened image segment.

2. The method according to claim 1, wherein the recognizing of the road sign (Hz, Zz) while taking account of the sharpened image segment comprises performing text recognition in the sharpened image segment.

3. The method according to claim 1, wherein the determining of the motion blur comprises analyzing data characterizing a motion of the vehicle.

4. The method according to claim 1, wherein the determining of the motion blur comprises determining and analyzing edges in the image segment in which the road sign (Hz, Zz) is situated.

5. The method according to claim 1, further comprising recognizing a static content (S) of the road sign (Hz, Zz) and partially recognizing the road sign from the acquired image in consideration of the static content, and wherein the determining of the motion blur in the image segment comprises taking into consideration a predetermined road sign template corresponding to the partially recognized road sign, and further comprising recognizing a variable content (V) of the road sign (Hz, Zz) while taking account of the sharpened image segment.

6. The method according to claim 5, wherein the static content (S) comprises a shape and an edge of the road sign which is a main road sign (Hz).

7. The method according to claim 5, wherein the image segment is formed such that the at least one road sign situated in the image segment includes at least one main road sign (Hz) and all of one or more additional signs (Zz) that are associated with the at least one main road sign, wherein an entirety of at least one sign among the at least one main road sign (Hz) is recognized as the static content and a content of the one or more additional signs (Zz) is recognized as the variable content.

8. The method according to claim 1, wherein the at least one road sign includes plural road signs, further comprising forming a separate said image segment respectively for each individual road sign (Hz or Zz) among the plural road signs included in the image, subsequently performing a check as to whether at least two road signs (Hz, Zz) among the plural road signs are assigned to or associated with each other, and, when the check is affirmative, then the motion blur is determined only for a first said image segment and is then adopted for at least a further one of said image segments assigned thereto.

9. The method according to claim 1, wherein, if the recognition of the road sign (Hz, Zz) while taking account of the sharpened image segment is not successful or not reliable, then further comprising creating a synthetic highly sharp image segment is created from a plurality of sharpened image segments extracted from successive images acquired by the camera, each of said sharpened image segments including the road sign (Hz, Zz), wherein the road sign (Hz, Zz) is recognized while taking account of the synthetic highly sharp image segment.

10. A device for road sign recognition comprising:
    a camera configured and arranged on a traveling vehicle to acquire image data including at least one image of surroundings of the traveling vehicle, and
    an image analysis unit configured and arranged to detect a presence of a road sign (Hz, Zz) from the image data, to determine a motion blur in an image segment in which the road sign (Hz, Zz) is situated, to subtract at least some of the motion blur out of the image segment, which results in a sharpened image segment, to recognize the road sign (Hz, Zz) while taking account of the sharpened image segment, and to generate a corresponding output signal.

* * * * *

UNITED STATES PATENT AND TRADEMARK OFFICE
CERTIFICATE OF CORRECTION

PATENT NO. : 9,697,430 B2
APPLICATION NO. : 14/902246
DATED : July 4, 2017
INVENTOR(S) : Steen Kristensen Page 1 of 1

It is certified that error appears in the above-identified patent and that said Letters Patent is hereby corrected as shown below:

On the Title Page

Item [71], Applicant, Line 1, after "Conti Temic", replace "microelectric" with --microelectronic--;
Page 2, right column, OTHER PUBLICATIONS, Line 12, replace "Michel" with --Michal--;

In the Specification

Column 7,
Line 15, after "and", delete ",".

Signed and Sealed this
Twentieth Day of February, 2018

Andrei Iancu
*Director of the United States Patent and Trademark Office*